(12) United States Patent
Hanes

(10) Patent No.: US 9,633,585 B1
(45) Date of Patent: Apr. 25, 2017

(54) MODULAR SIGN ASSEMBLY

(71) Applicant: Gary Hanes, Wattsburg, PA (US)

(72) Inventor: Gary Hanes, Wattsburg, PA (US)

( * ) Notice: Subject to any disclaimer, the term of this patent is extended or adjusted under 35 U.S.C. 154(b) by 0 days.

(21) Appl. No.: 15/266,015

(22) Filed: Sep. 15, 2016

(51) Int. Cl.
  G09F 15/00 (2006.01)
  G09F 13/18 (2006.01)
  H02S 30/20 (2014.01)
  H02S 40/38 (2014.01)

(52) U.S. Cl.
  CPC .......... *G09F 15/0012* (2013.01); *G09F 13/18* (2013.01); *G09F 15/0025* (2013.01); *H02S 30/20* (2014.12); *H02S 40/38* (2014.12); *G09F 2013/1881* (2013.01); *G09F 2015/0093* (2013.01)

(58) Field of Classification Search
  CPC ............. G09F 15/0012; G09F 15/0025; G09F 2013/1881; G09F 2015/0093; E01F 13/02
  See application file for complete search history.

(56) References Cited

U.S. PATENT DOCUMENTS

| | | | |
|---|---|---|---|
| 2,759,707 A | 8/1956 | Hauser | |
| 2,930,589 A | 3/1960 | Blaskiewicz | |
| 3,622,125 A | 11/1971 | Powell | |
| 3,868,630 A * | 2/1975 | Lesondak | E01F 13/02 116/63 P |
| 4,943,035 A | 7/1990 | Thomson et al. | |
| 5,083,390 A * | 1/1992 | Edman | G09F 7/18 40/607.02 |
| D327,658 S | 7/1992 | Kulp | |
| 5,482,398 A | 1/1996 | Finke | |
| 5,551,178 A * | 9/1996 | Foley | G09F 15/0062 248/431 |
| 6,038,802 A * | 3/2000 | Tidwell | G09F 15/0025 135/127 |
| 6,708,643 B2 | 3/2004 | Traiforos | |
| 7,866,074 B2 * | 1/2011 | McComb | B43K 23/001 160/135 |
| 2006/0156601 A1 * | 7/2006 | Haggard | G09F 15/0025 40/604 |
| 2014/0026453 A1 * | 1/2014 | Weis | G09F 15/0012 40/606.15 |

* cited by examiner

Primary Examiner — Gary Hoge

(57) ABSTRACT

A modular sign assembly includes a perimeter frame including an upper support, a lower support, a first lateral support and second lateral support. Each of the upper and lower supports is removably engaged with each of the first and second lateral supports. The first and second lateral supports each include a housing having a top end, a bottom end and a perimeter wall. A light emitter is mounted in the housing and emits light outwardly from the perimeter wall when the light emitter is turned on. A rechargeable battery is mounted within the housing and is electrically coupled to the light emitter. Each of the first and second lateral supports has a receivers attached thereto and each receiver receives two legs. A flexible panel is positioned within the perimeter frame. A plurality of couplers releasably couples the flexible panel to the perimeter frame.

7 Claims, 7 Drawing Sheets

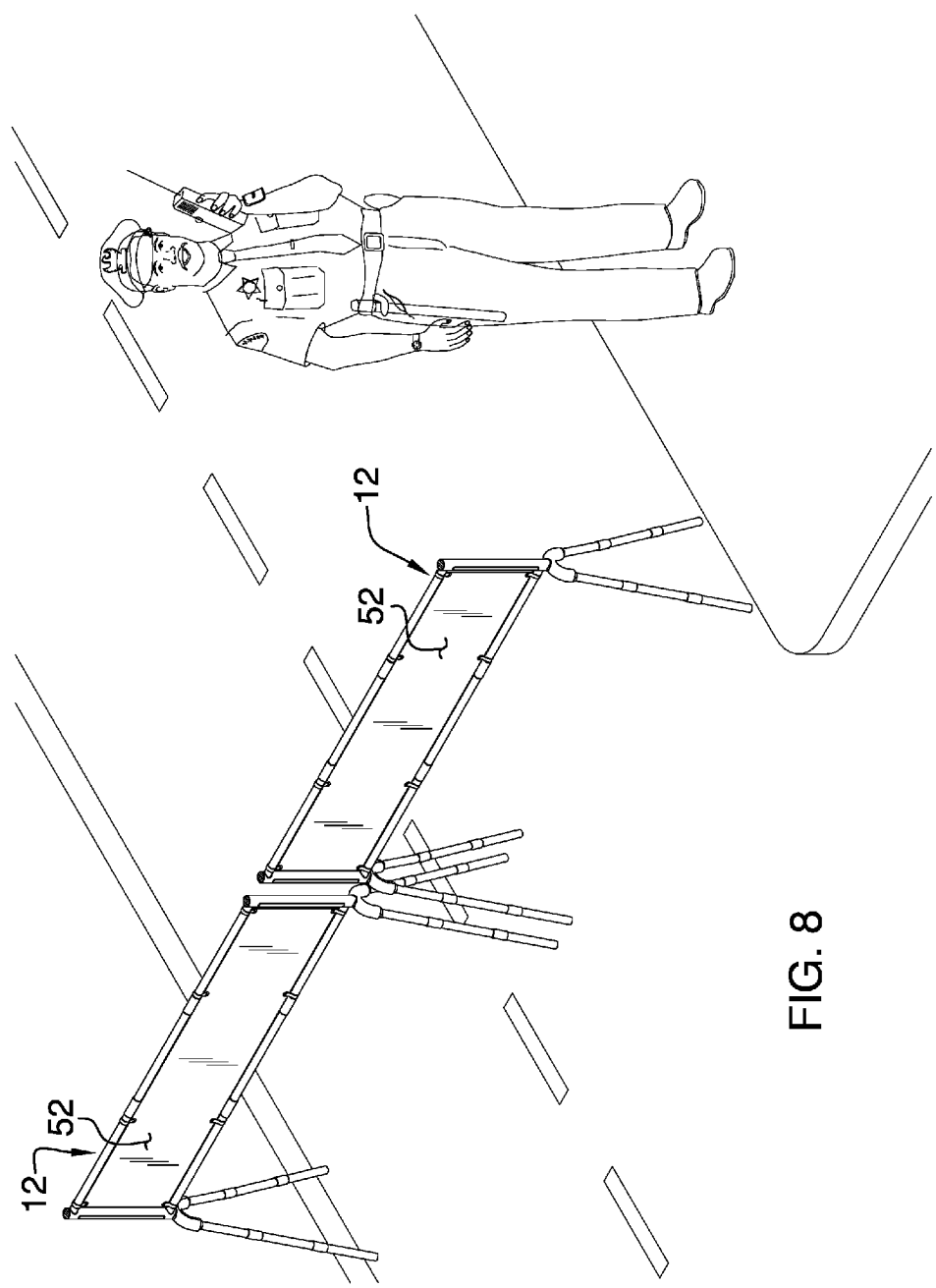

MODULAR SIGN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
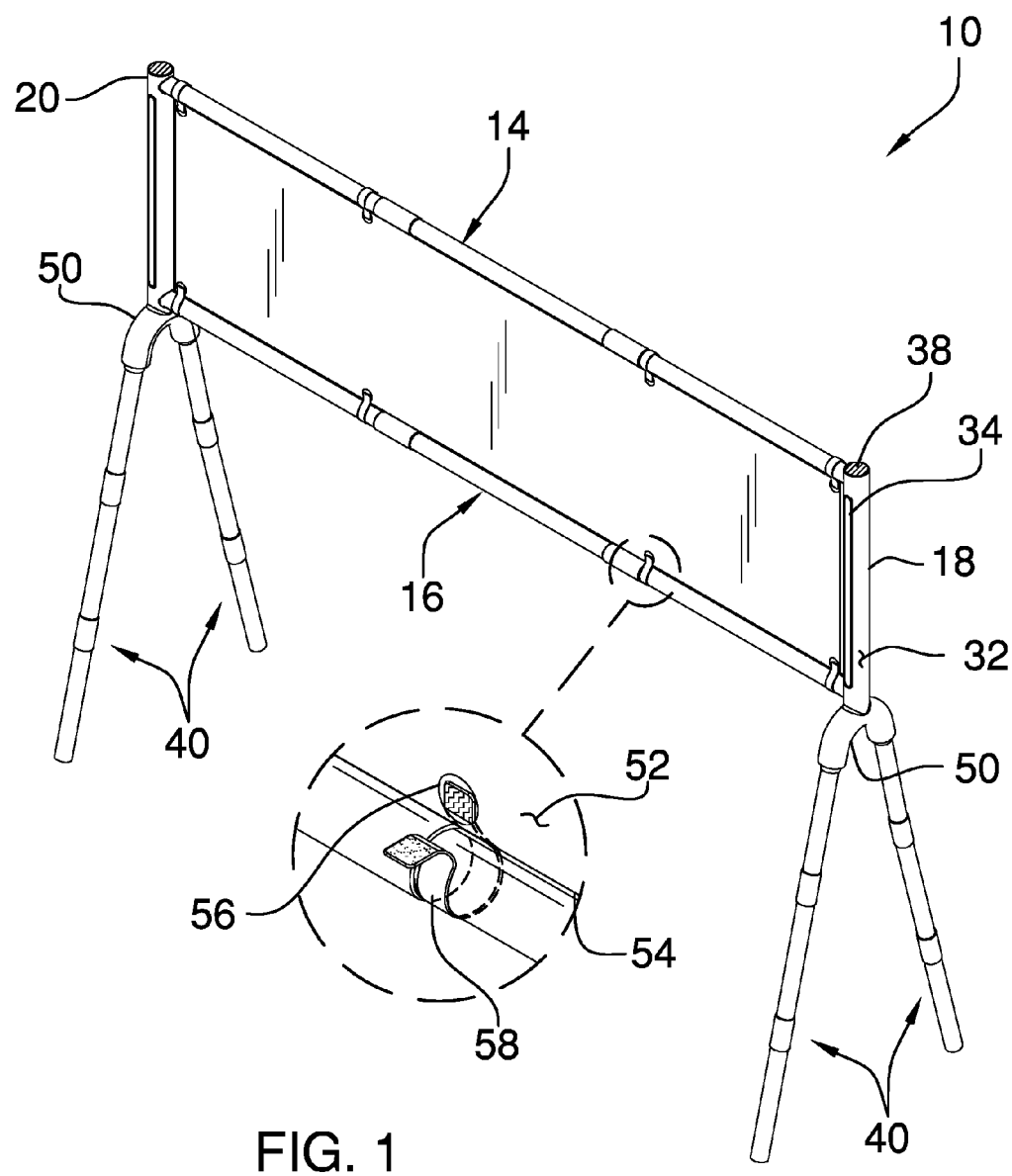

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to collapsible sign devices and more particularly pertains to a new collapsible sign device that is easily transportable and erected where needed for traffic control and warning scenarios.

BRIEF SUMMARY OF THE INVENTION

An embodiment of the disclosure meets the needs presented above by generally comprising a perimeter frame including an upper support, a lower support, a first lateral support and second lateral support. Each of the upper and lower supports is removably engaged with each of the first and second lateral supports. The first and second lateral supports each include a housing having a top end, a bottom end and a perimeter wall. A light emitter is mounted in the housing and emits light outwardly from the perimeter wall when the light emitter is turned on. A rechargeable battery is mounted within the housing and is electrically coupled to the light emitter. Each of the first and second lateral supports has a receivers attached thereto and each receiver receives two legs. A flexible panel is positioned within the perimeter frame. A plurality of couplers releasably couples the flexible panel to the perimeter frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

Figure 2:
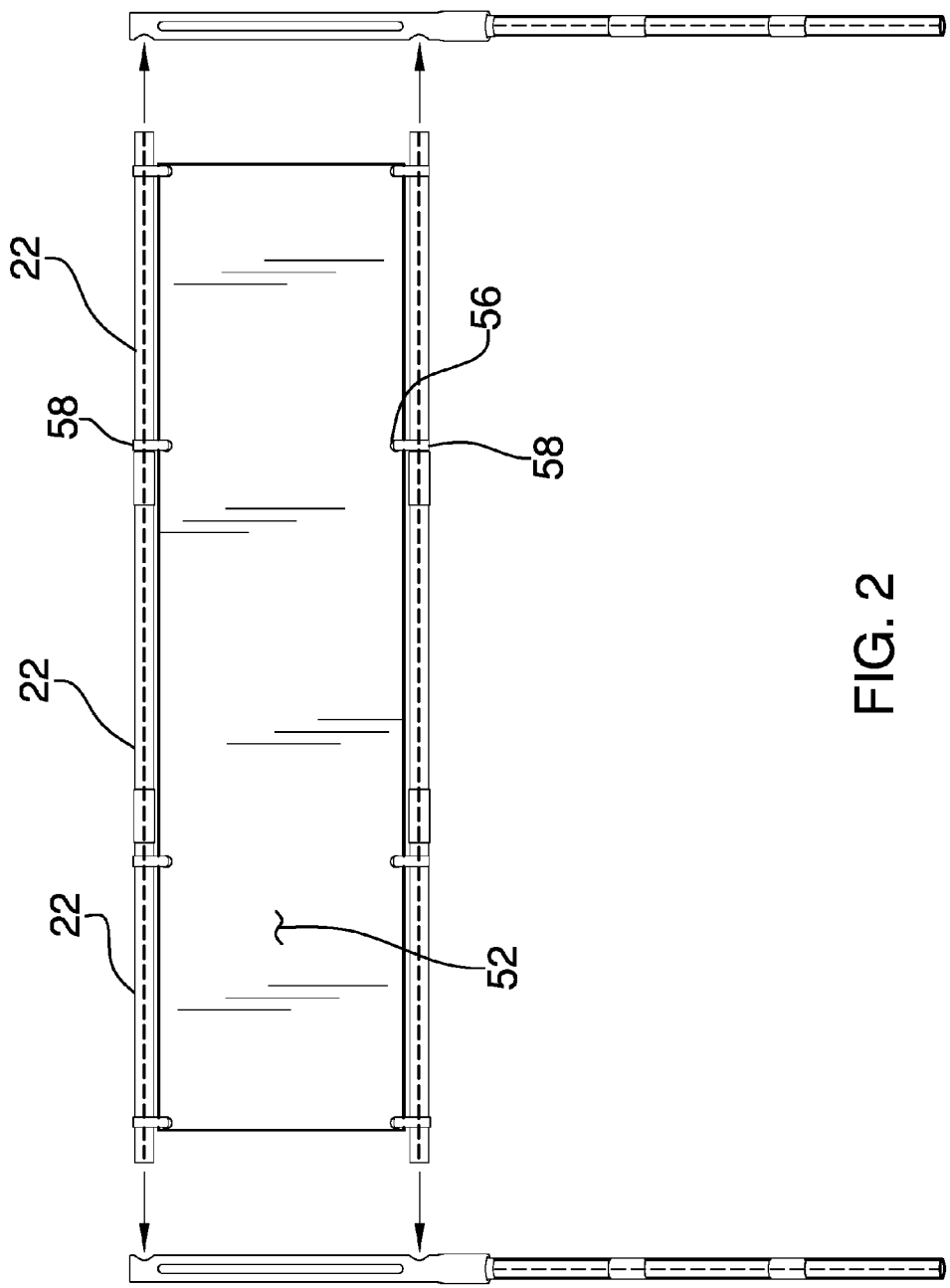
Figure 3:
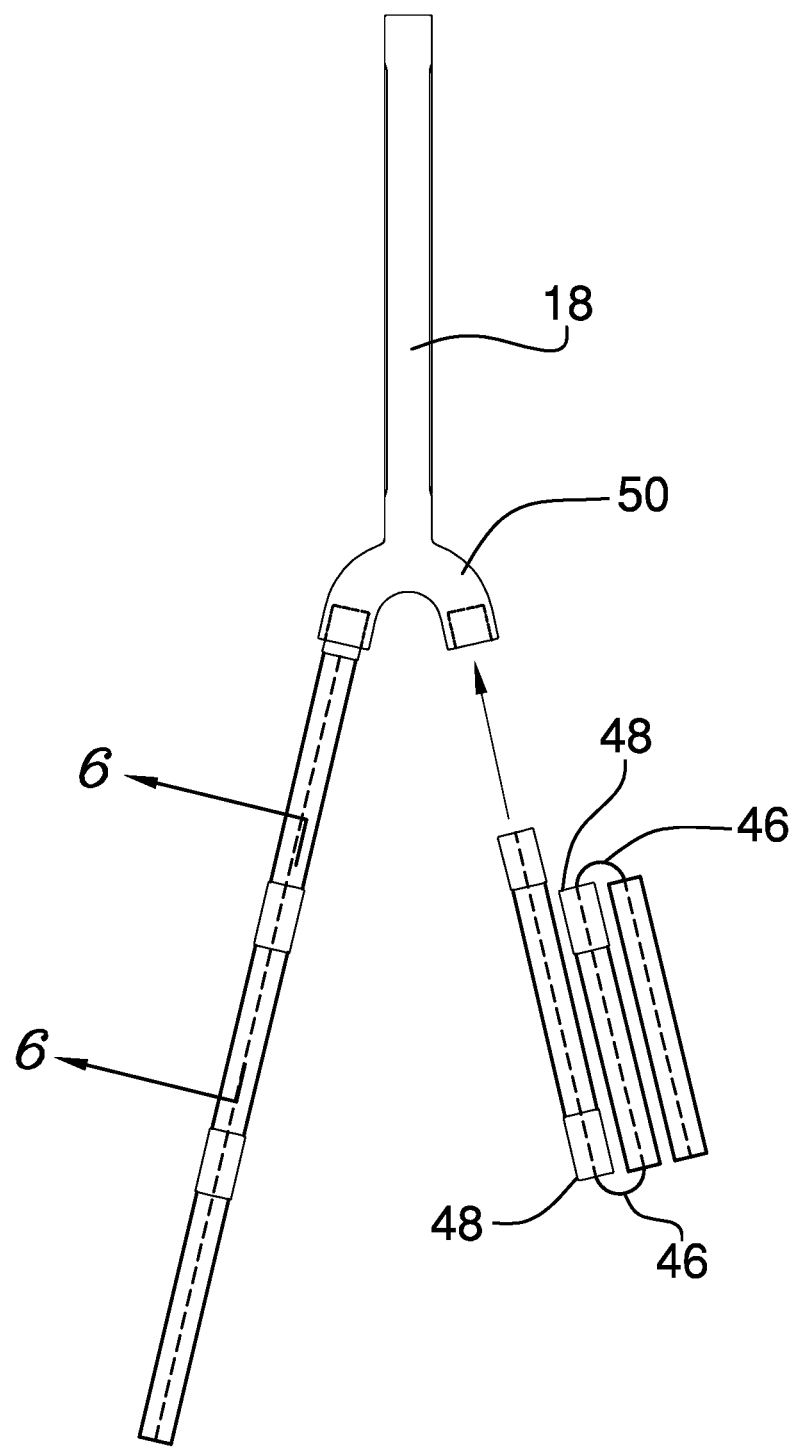
Figure 4:
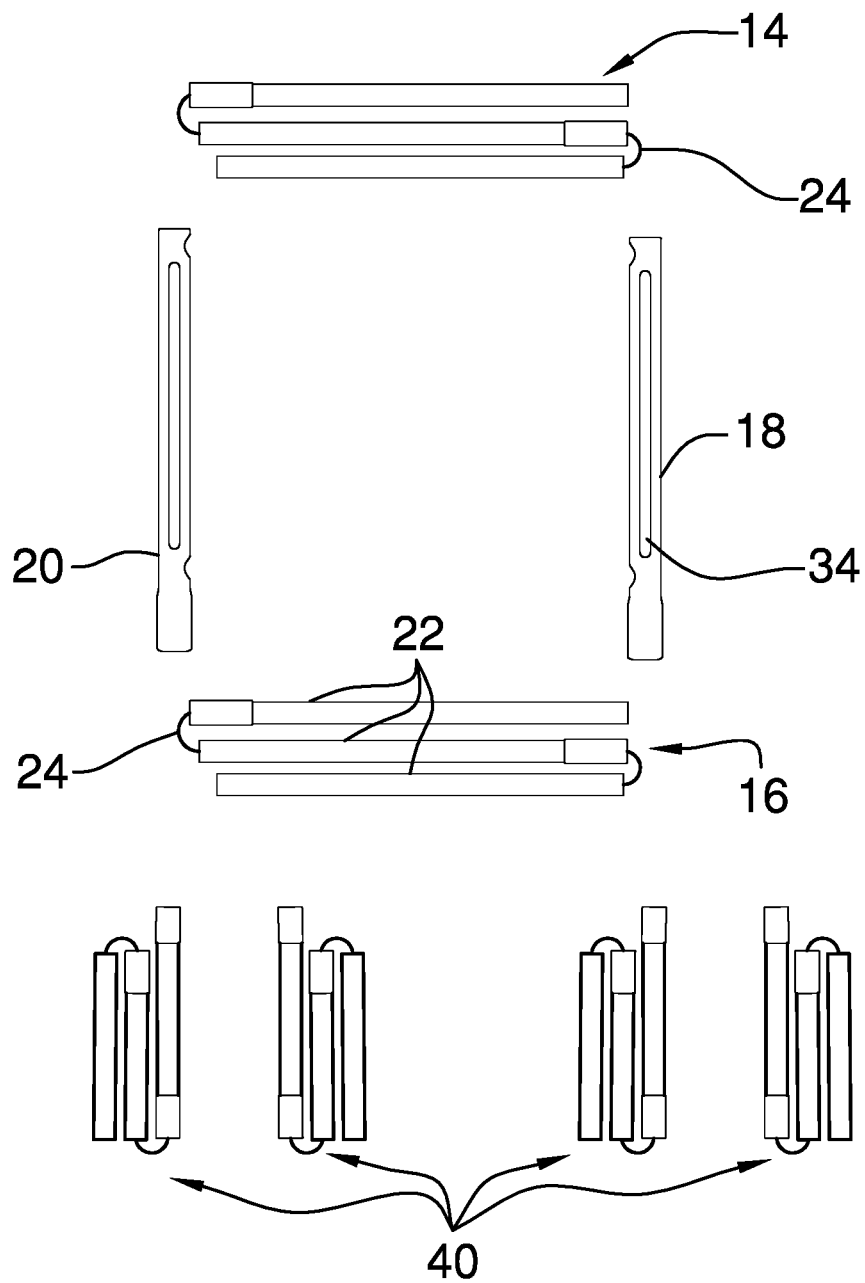
Figure 5:
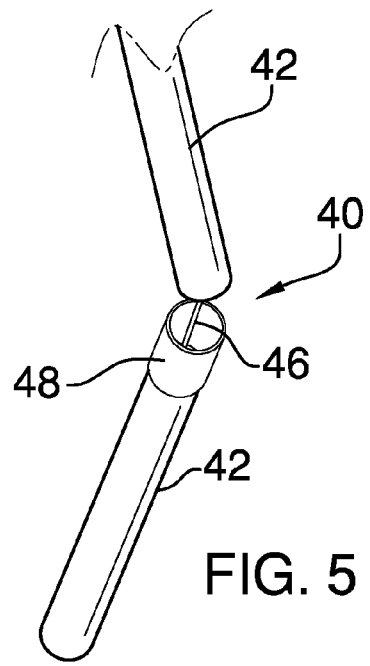
Figure 6:
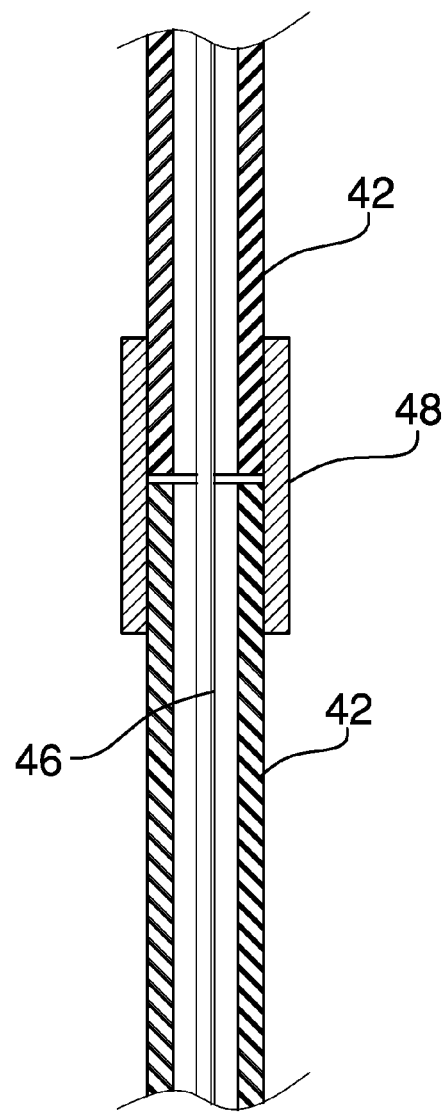
Figure 7:
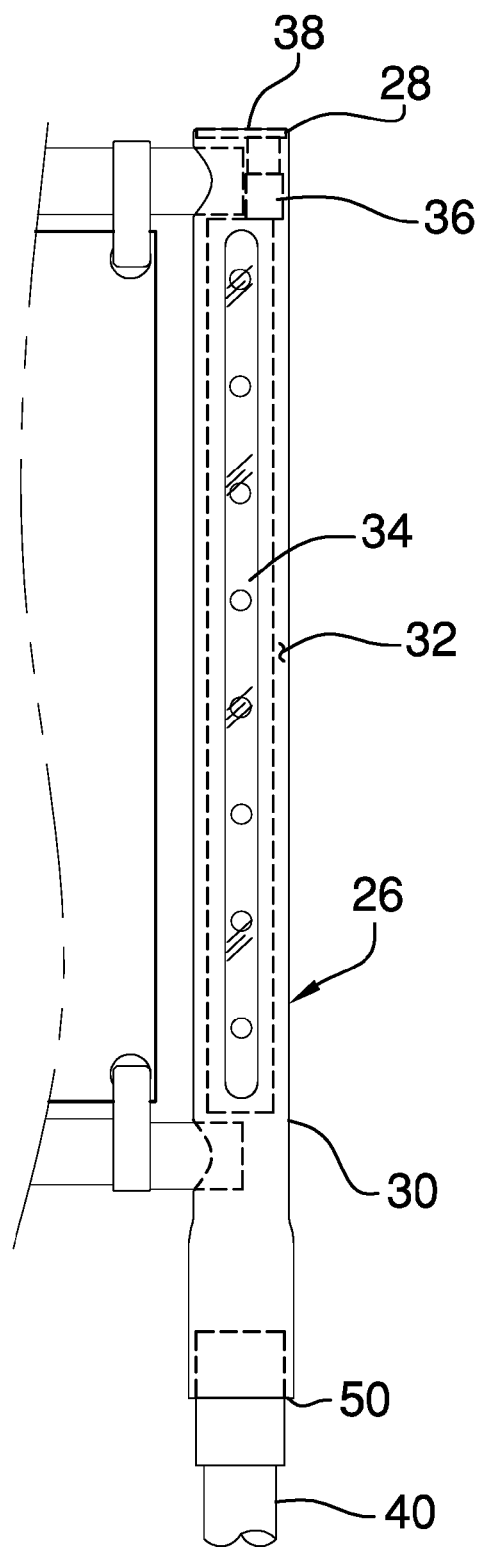

The disclosure will be better understood and objects other than those set forth above will become apparent when consideration is given to the following detailed description thereof. Such description makes reference to the annexed drawings wherein:

FIG. 1 is a front perspective view of a modular sign assembly according to an embodiment of the disclosure.
FIG. 2 is a front view of an embodiment of the disclosure.
FIG. 3 is a side view of an embodiment of the disclosure.
FIG. 4 is a front view of an embodiment of the disclosure.
FIG. 5 is a perspective view of a leg of an embodiment of the disclosure.
FIG. 6 is a cross-sectional view of an embodiment of the disclosure taken along line 6-6 of FIG. 3.
FIG. 7 is a front broken view of an embodiment of the disclosure.
FIG. 8 is a perspective in-use view of an embodiment of the disclosure.

DETAILED DESCRIPTION OF THE INVENTION

With reference now to the drawings, and in particular to FIGS. 1 through 8 thereof, a new collapsible sign device embodying the principles and concepts of an embodiment of the disclosure and generally designated by the reference numeral 10 will be described.

As best illustrated in FIGS. 1 through 8, the modular sign assembly 10 generally comprises a perimeter frame 12 including an upper support 14, a lower support 16, a first lateral support 18 and second lateral support 20. Each of the upper 14 and lower 16 supports is removably engaged with each of the first 18 and second 20 lateral supports. This may be done with a friction fit other conventional attaching method. As shown in FIG. 7, the upper 14 and lower 16 supports extend into the first 18 and second 20 lateral supports. The upper 14 and lower 16 supports each comprise a plurality of support sections 22 releasably coupled together. As can be seen in FIG. 4, elastic cords 24 may be extended through the support sections 22 to allow them to be easily aligned and fitted into each other to form one elongated member. Each of the upper 14 and lower 16 supports has a length between 3.0 feet and 4.0 feet and each of the first 18 and second 20 lateral supports has a height between 0.8 feet and 2.0 feet.

The first 18 and second 20 lateral supports further each include a housing 26 that has a top end 28, a bottom end 30 and a perimeter wall 32. A light emitter 34 is mounted in the housing 26 and emits light outwardly from the perimeter wall 32 when the light emitter 34 is turned on. The light emitter 34 extends at least 80% of a distance from the top end 28 to the bottom end 30 to provide an easily viewable display. The light emitter 34 may be positioned only on a front side of the vertical supports 18, 20 or may be positioned on both the front and back sides of the vertical supports 18, 20 as shown in FIG. 3. The light emitter 34 may comprise a plurality of light emitting diodes positioned within the housing 26 with windows formed in the perimeter wall 32 allow light to be emitted through the perimeter wall 32. A rechargeable battery 36 is mounted within the housing 26 and is electrically coupled to the light emitter 34. A solar panel 38 is mounted on the housing 26 and is electrically coupled to the rechargeable battery 36 and is configured to recharge the rechargeable battery 36 when the solar panel 38 is exposed to sunlight. The first 18 and second 20 lateral supports may each include an actuator, not shown, for the associated light emitter 34. The actuator may include a button or switch for turning the light emitter 34 on or off or may include a light detector which turns on the light emitter 34 when ambient light levels indicate darkness.

A plurality of legs 40 is provided and each of the legs 40 comprises a plurality of leg sections 42 releasably coupled together. As with the upper 14 and lower 16 supports, the legs 40 may also include elastic cords 46 therein for assisting in aligning and pulling together the leg sections 42. The leg sections 42 and the support sections 22 may include sleeves 48 for interconnection of the leg sections 42 together and the support sections 22 together. A pair of receivers 50 is provided and releasably receives two of the legs 40 so that the legs 40 are angled outwardly from each other as shown in FIG. 1 to provide stability to the assembly 10. Each of the first 18 and second 20 lateral supports has one of the receivers 50 attached thereto such that receivers 50 extend downwardly from an associated one of the first 18 and second 20 lateral supports. The legs 40 may extend into and frictionally engage the receivers 50.

A flexible panel 52 is positioned within the perimeter frame 12. The flexible panel 52 has a perimeter edge 54 and the flexible panel 52 may have a plurality of apertures 56 extending therethrough. The apertures 56 are mounting apertures and are positioned adjacent to the perimeter edge 54. The flexible panel 52 may have indicia thereon and a plurality of panels 52 may be provided each having different indicia thereon so that an appropriate message may be selected and displayed as needed. A plurality of couplers 58 is provided. Each of the couplers 58 extends around one of the upper 14 and lower 16 supports such that each of the upper 14 and lower 16 supports has at least three of the couplers 58 positioned thereon. Each of the couplers 58 extends through one the apertures 56 to releasably secure the flexible panel 52 to the perimeter frame 12. The couplers 58 may include flexible strips having hook and loop fasteners thereon for forming a closed loop that extends through one of the apertures 56 and an adjacent one of the upper 14 or lower 16 supports.

In use, the assembly 10 is used primarily during hazardous situations on a roadway where signage is needed to block roadways and intersections, warn motorists to slow down, warn of hazards or indicate other emergency situations. The assembly 10 is collapsible, as shown in FIG. 4, so that it may be easily stored within a trunk and then quickly assembled as needed. The couplers 58 allow for changing of the panel 52 as needed depending on the requirements of the situation presented.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible sign assembly comprising:
    a perimeter frame including an upper support, a lower support, a first lateral support and second lateral support, each of said upper and lower supports being removably engaged with each of said first and second lateral supports;
    said first and second lateral supports each including:
        a housing having a top end, a bottom end and a perimeter wall;
        a light emitter being mounted in said housing and emitting light outwardly from said perimeter wall when said light emitter is turned on;
        a rechargeable battery being mounted within said housing and being electrically coupled to said light emitter;
    a plurality of legs;
    a pair of receivers each releasably receiving two of said legs, each of said first and second lateral supports having one of said receivers attached thereto, said receivers extending downwardly from an associated one of said first and second lateral supports;
    a flexible panel being positioned within said perimeter frame; and
    a plurality of couplers releasably coupling said flexible panel to said perimeter frame.

2. The collapsible sign assembly according to claim 1, wherein said upper and lower supports each comprise a plurality of support sections releasably coupled together.

3. The collapsible sign assembly according to claim 1, wherein each of said upper and lower supports has a length between 3.0 feet and 4.0 feet, each of said first and second lateral supports having a height between 0.8 feet and 2.0 feet.

4. The collapsible sign assembly according to claim 1, said light emitter of each horizontal support extends at least 80% of a distance from said top end to said bottom end.

5. The collapsible sign assembly according to claim 1, wherein each of said horizontal supports includes a solar panel being mounted in said housing and being electrically coupled to said rechargeable battery and configured to recharge said rechargeable battery when said solar panel is exposed to sunlight.

6. The collapsible sign assembly according to claim 1, wherein each of said legs comprises a plurality of leg sections releasably coupled together.

7. A collapsible sign assembly comprising:
    a perimeter frame including an upper support, a lower support, a first lateral support and second lateral support, each of said upper and lower supports being removably engaged with each of said first and second lateral supports, said upper and lower supports each comprising a plurality of support sections releasably coupled together, each of said upper and lower supports having a length between 3.0 feet and 4.0 feet, each of said first and second lateral supports having a height between 0.8 feet and 2.0 feet;
    said first and second lateral supports each including:

a housing having a top end, a bottom end and a perimeter wall;

a light emitter being mounted in said housing and emitting light outwardly from said perimeter wall when said light emitter is turned on, said light emitter extending at least 80% of a distance from said top end to said bottom end;

a rechargeable battery being mounted within said housing and being electrically coupled to said light emitter;

a solar panel being mounted in said housing and being electrically coupled to said rechargeable battery and configured to recharge said rechargeable battery when said solar panel is exposed to sunlight;

a plurality of legs, each of said legs comprising a plurality of leg sections releasably coupled together;

a pair of receivers each releasably receiving two of said legs, each of said first and second lateral supports having one of said receivers attached thereto, said receivers extending downwardly from an associated one of said first and second lateral supports;

a flexible panel being positioned within said perimeter frame, said flexible panel having a perimeter edge, said panel having a plurality of apertures extending therethrough, said apertures being positioned adjacent to said perimeter edge; and a plurality of couplers, each of said couplers extending around one of said upper and lower supports, each of said couplers extending through one said apertures to releasably secure said flexible panel to said perimeter frame.

* * * * *